United States Patent [19]

Wolf

[11] Patent Number: 4,876,799

[45] Date of Patent: Oct. 31, 1989

[54] LEVEL SENSING UNIT AND A LEVEL INDICATING DEVICE THEREON

[76] Inventor: Kenneth E. Wolf, 995 Sheridan, Wauconda, Ill. 60084

[21] Appl. No.: 227,696

[22] Filed: Aug. 3, 1988

[51] Int. Cl.⁴ .......................... C01C 9/06; B60Q 1/52
[52] U.S. Cl. ....................................... 33/366; 33/396; 33/378
[58] Field of Search ................. 33/366, 396, 378, 365, 33/391; 340/689; 200/153 A, 84 R; 61.45 R, 61.52, 61.48

[56] References Cited

U.S. PATENT DOCUMENTS

| | | | |
|---|---|---|---|
| 1,391,782 | 9/1921 | McDannold | 200/61.52 |
| 2,573,479 | 10/1951 | McNerney | 200/61.48 |
| 2,722,056 | 11/1955 | Stimler | 33/366 |
| 3,161,739 | 12/1964 | Suozzo | 340/689 |
| 3,233,235 | 2/1966 | Wright | 33/366 |
| 3,559,294 | 2/1971 | Bauer | 33/366 |
| 3,660,840 | 5/1972 | Plofchan | 33/366 |
| 4,034,481 | 7/1977 | Stoltz | 33/396 |
| 4,096,638 | 6/1978 | Schimming | 33/378 |
| 4,152,839 | 5/1979 | McDonald | 33/366 |
| 4,356,638 | 11/1982 | McKenna et al. | 33/366 |
| 4,685,218 | 8/1987 | Wolf | 33/366 |
| 4,760,649 | 8/1988 | Preston et al. | 33/366 |

FOREIGN PATENT DOCUMENTS

| | | | |
|---|---|---|---|
| 474694 | 6/1929 | Fed. Rep. of Germany | 33/396 |
| 8707713 | 12/1987 | Int'l Pat. Institute | 33/391 |
| 14513 | 1/1986 | Japan | 33/366 |
| 99814 | 5/1986 | Japan | 33/391 |
| 438870 | 1/1975 | U.S.S.R. | 33/396 |

Primary Examiner—William A. Cuchlinski, Jr.
Assistant Examiner—Thomas B. Will
Attorney, Agent, or Firm—Eugene I. Snyder

[57] ABSTRACT

A level sensing unit, designed to be incorporated in a carpenter's level, is relatively insensitive to the expansion and contraction of the buoyant fluid, independent of the specific gravity of the fluid, and virtually free of oscillations accompanying a change in liquid orientation. The device can be constructed inexpensively of commonly available materials. The device has a cylindrical float mounted on a centrally positioned axle with a plate extending above the float surfaces and placed normal to the axle. The axle extends between the walls of a sealed housing, and adjacent to the edge of the plate are two electrically conducting strips. At level neither strip contacts the edge of the plate, but when the unit is not at level one or the other strip makes physical and electrical contact.

4 Claims, 3 Drawing Sheets

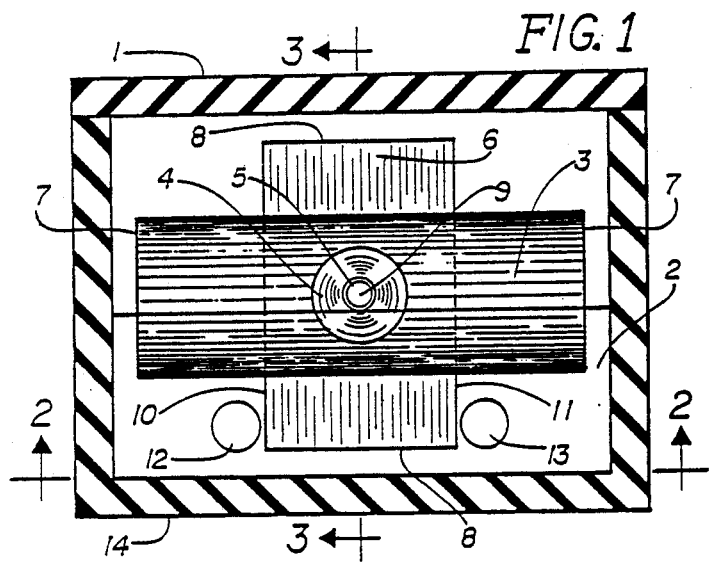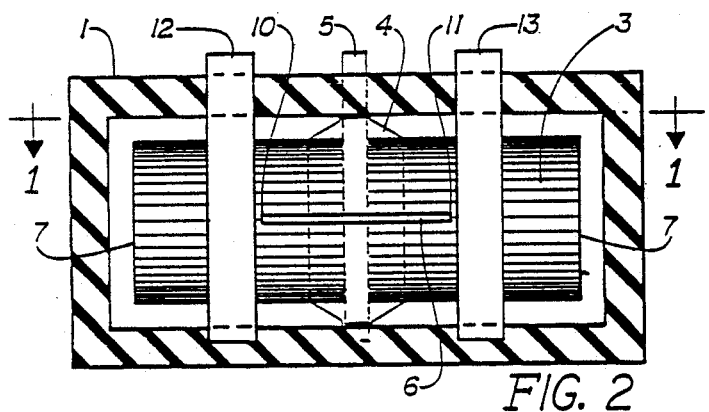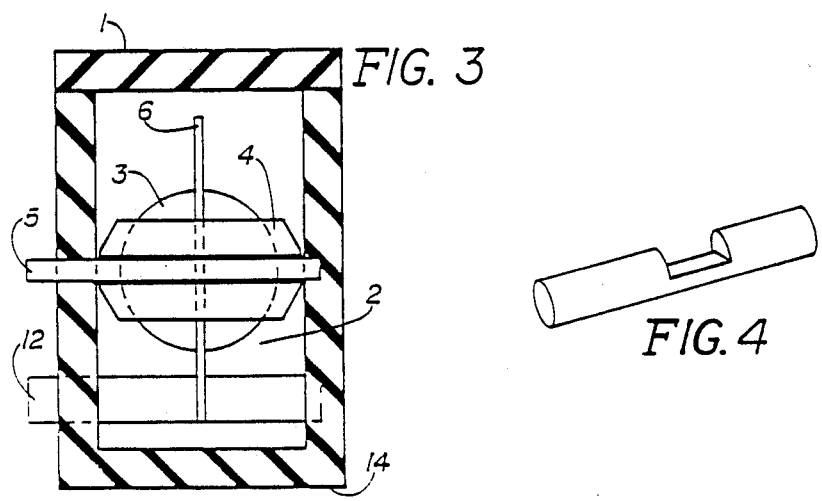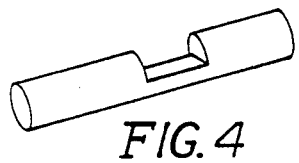

LEVEL SENSING UNIT AND A LEVEL INDICATING DEVICE THEREON

BACKGROUND OF THE INVENTION

Virtually from the beginning of recorded history man has required the means to determine true horizontal and vertical in major construction of all types. This need has continued undiminished to the present time, and in fact the primitive carpenter's level has persevered virtually unchanged for many years. In such a level a vial or generally cylindrical container is partially filled with a liquid so a bubble of air remains. When the vial is place horizontally on a level surface, i.e., when the axis of the vial is coparallel with the local horizon, the bubble will be equidistant from the ends of the cylinder, i.e., it will be centered. Any deviation from level will be manifested by deviations of the bubble from centrality, i.e., it will be closer to one end than the other. In this application, horizontal level will mean a line coparallel to the local horizon, and vertical level will mean a line perpendicular to the local horizon.

The classical bubble level has limitations in accuracy as well as convenience. Because it relies on visual sighting when used in, e.g., carpentry the user's eyes may need to continually shift between the level and the focus of his work, such as the end of a beam. Consequently, there is a need for a level which can be used by one person without attendant constant close eye contact. It is desirable that such a level be responsive, both in the sense of a rapid response time to changes in horizontal position, and in the sense of having the capability of detecting small deviations from absolute level. Additionally it is paramount that such a level be sturdy, inexpensive, simple to manufacture, and convenient to use under extremes of field conditions such as temperature, humidity, and cramped work space.

Although there are examples of levels and level sensing units based on electroptical devices capable of great precision and accuracy such articles are excluded from further consideration here because of their cost and sometimes because of their inconvenience in operation. The construction worker, for example, needs a much simpler device. Perhaps the best example of an attempt to fill this need is that described in U.S. Pat. No. 4,152,839, which utilizes a sealed capsule containing a bead of mercury which acts much like an air bubble in a vial of liquid. When in a horizontal level position mercury, an electrical conductor, is at the center and in electrical contact with electrodes which energize a current indicating a level status, e.g., a buzzer or bulb. When in a position deviating from horizontal the bead of mercury tends to roll away from the center, breaking electrical contact and deenergizing the circuit. The many possible variations of this theme need not be elaborated on at this time.

The above design is essentially a mercury-actuated switch. An acknowledged limitation of such a switch is its relatively sluggish response and insensitivity to small changes, both arising because the extremely high surface tension of mercury requires a relatively large degree of angular change from level for movement of the mercury bead. Although somewhat of an exaggeration, it is almost as if such a mercury-actuated switch exhibits a step response rather than a continual one to changes in angular position of the mercury-containing capsule.

In U.S. Pat. No. 4,685,218 I have devised a simple but accurate level sensing unit with a rapid response time and which can readily drive or be incorporated into an electrical circuit indicating the state of level. The level sensing unit is easily incorporated into, for example, a contractor's level to afford a device which is significantly advantageous relative to prior art levels. As significant as is the advance presented by this level sensing unit, nonetheless certain improvements were judged to be desirable. One goal was to reduce the sensitivity of operation of the level to expansion and contraction of the liquid exerting a buoyant force on floats connected to electrical contacts. A second goal was to make the operation virtually independent of the specific gravity of the liquid providing the buoyant force, and preferably to make a level sensing unit operate effectively with a buoyant liquid of specific gravity of about 1 or even less. Although the prior art level sensing unit worked even with a liquid of specific gravity near 1, it operated best when the specific gravity was at least 1.5. Another goal was to further improve the response of the unit to changes in liquid orientation. Thus, perturbations in liquid orientation imparted some tendency to the float of the prior liquid sensing unit to oscillate like a pendulum.

Upon considering this wish list of improvements it occurred to me that all could be achieved if the unit bearing the moving contacts was on an axis so that the resulting torque about the axis was zero regardless of the unit's orientation. Stated differently, the requirement is that the unit's pivot points be coincident with an axis with respect to which the unit has a zero moment of inertia. Such a requirement is equivalent to every plane intersecting and normal to the axis coincident with the pivot points (or axle) being symmetric with respect to inversion about the point of intersection. With such an arrangement motion about the axle is unattended by oscillation. If the unit has the same symmetry along a second axis normal to the first axis mentioned above then it also will be relatively insensitive to the contraction and expansion of the liquid exerting the buoyant force and to the specific gravity of that liquid. My invention is just such a liquid sensing unit.

For the purpose of this application, inversion symmetry means that every plane of a body normal to an axis of rotation is invariant to inversion about a point in the plane representing the intersection with the rotational axis. Stated differently, such planes of a body are invariant to the transformation $p(r,\theta) \rightarrow p(r,\theta+180°)$ where $r$ and $\theta$ are the polar coordinates of point p.

SUMMARY OF THE INVENTION

The purpose of this invention is to make a level sensing unit which is inexpensive, reliable, and easy to incorporate into a contractor's level while making it sensitive to small deviations from level with a rapid response to angular changes, insensitive to the expansion and contraction of the liquid exerting a buoyant force, and relatively free from oscillations. An embodiment is a cylindrical float pivoting on an axle coincident with a minor axis, having a flat plate inserted in the float along its major axis, but placed symmetrically with respect to the axle, place in a sealed housing having two electrical strips adjacent to the edges of the plate. A more general embodiment can be expressed solely in terms of bodies having certain symmetry.

DESCRIPTION OF THE FIGURES

FIG. 1 is a side cross sectional view of one embodiment of a level sensing unit.

FIG. 2 is a view along 2—2 of FIG. 1.

FIG. 3 is a view along 3—3 of FIG. 1.

FIG. 4 is a perspective view of a cam-like conducting strip.

DESCRIPTION OF THE INVENTION

Figure 5:
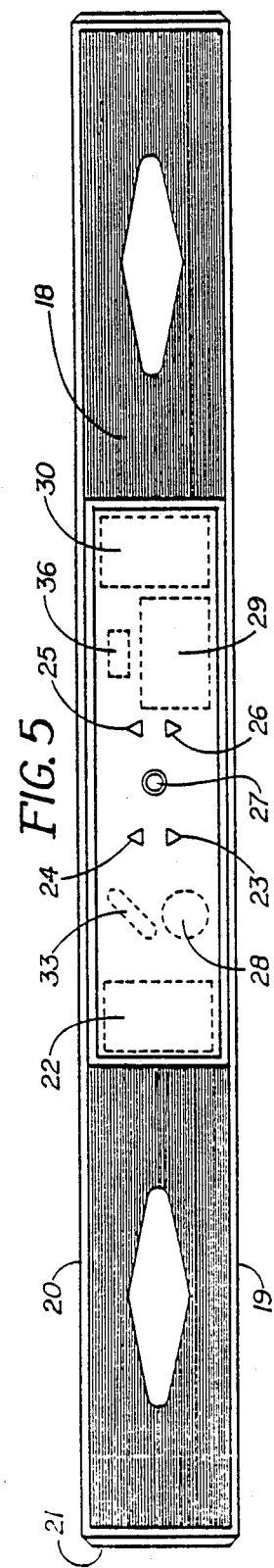
FIG. 5 is a front view of a level indicating device.

The level sensing unit which is my invention is capable of many design variations which are a matter of choice to one skilled in this art. The detailed description which follows often will indicate some of the possible variations, yet for ease of exposition and understanding the description most usually will be couched in terms of just the embodiment incorporated in the figures. Yet it must be clearly understood and emphasized that the figures represent a number of possible embodiments of an invention all of whose embodiments reside in the invention as claimed.

The level sensing unit comprises a sealed housing, 1, which most generally will be box-like in shape, as in the figures. Because the housing contains liquid it is necessary that the housing material be nonporous, nonabsorbtive, and unreactive with respect to the liquid it is designed to contain. The housing is enclosed, and since the level sensing unit is designed to be insensitive to expansion and contraction of the buoyant liquid contained in the housing there is no need to access the reservoir to adjust the height of the liquid therein so that the housing may be permanently sealed. The liquid reservoir is the lower portion of the interior of the housing generally underneath the float (vide infra) and is generally designated as 2. The functional relationship of the reservoir and the liquid therein to the elements of the level sensing unit is more extensively described below.

Where the housing is box-like a front and back, a top and bottom, and two side walls are inherent. However, the shape of the housing is not an element of my invention, and it will be easily appreciated that the housing can be of any convenient shape without affecting its performance. If, for example, the housing is spherical the terms top, bottom, etc., have no reference relative to the shape of the housing itself. Yet it must be emphasized that such terms are meaningful with reference to the internal elements of the housing which make up the level sensing unit which is my invention. The description which follows is couched in terms relative to a box-shaped housing for ease of understanding, but always with the realization that the shape of the housing is substantially unrelated, and not critical to, the success of the invention and that such descriptive terms are applicable to other housing shapes via the arrangement of the internal elements.

Within the housing there is a generally cylindrical member, 3, serving as a float, extending between the side walls and usually located in the upper portion of the housing. However, as FIG. 1 shows the float can be located approximately in the middle of the housing. In fact, the position of the float within the housing is not important to its proper operation. What is important is the relative position of the various elements of the liquid sensing unit within the housing. The float itself may be made of wood, of plastic, even of light metal. Most desirably the float is of low density so as to be maximally sensitive to the buoyant force of the liquid in the reservoir. Consequently the floats may be hollow as well as solid.

The float has a bushing, 4, located midway between the ends of the float, that is, the bushing is located centrally. The placement of the bushing is coincident with a short axis of the generally cylindrical float. At least one surface of the bushing must be electrically conductive since it will form part of an electrical circuit. Most usually the entire bushing is constructed of the same electrically conductive material.

An axle, 5, extends from the front to the back wall of the housing and is firmly imbedded in the walls. Like the bushing, at least the surface of the axle is electrically conducting, although normally the axle is made of the same electrically conducting material throughout. Because the axle is part of an electrical circuit, at least one end generally extends through one wall to the exterior of the housing to facilitate electrical connections. The float is pivotally mounted on the axle which passes through the bushing located along the short axis of the float, with the axle and bushing being in electrical contact.

The float has a flat plate, 6, of electrically conducting material inserted in the float and along its long axis. The flat plate is placed midway between the ends, 7, of the float, that is, between the terminii of the long axis of the float. Plate 6 extends symmetrically above the outside surfaces of the float as shown by 8 and is placed within the float as to be normal to the bushing located therein. The flat plate also is symmetrically disposed with respect to bushing 4 and in electrical contact with the bushing. That is, with respect to the center, 9, of the bushing the float and the flat plate is invariant to inversion and remains so irrespective of movement of the float about the axle.

Each of the edges of the plate, 10 and 11, is immediately adjacent or proximate to electrically conducting strips or posts, 12 and 13, but not in contact with them. The plate is centrally located with respect to these strips so that each edge is the same distance from the closest strip. For structural integrity, that is, mechanical strength, the strips most usually extend between the front and back walls, but this is not a necessary condition for proper operation of the level sensing unit. The bare necessity is that the strips extend sufficiently into the interior of the housing as to enable electrical contact with the edges of the flat plate when the float rotates. In one variant, the strips are generally cylindrical solids and are slotted or notched in that region where normally they come into contact with the edge of the plate; see FIG. 4. In this variant the strips are also rotatable like a cam, changing the effective distance between the plate edges and the electrical strips to adjust the sensitivity of the level sensing unit to angular deflection. Like the axle, at least one end of each conducting strip generally extends through the wall of the housing to its exterior to facilitate electrical connections.

Figure 7:
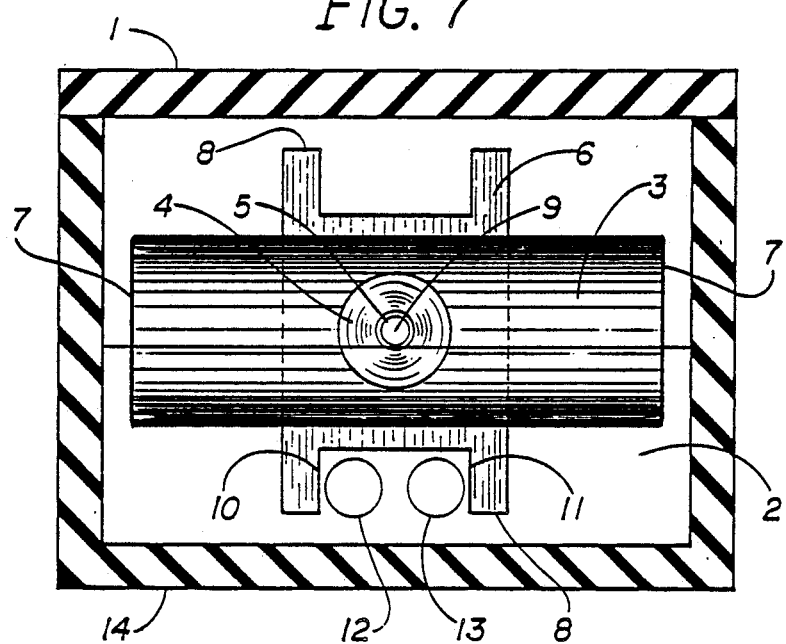
FIG. 7 is a side cross sectional view of a second embodiment.
Figure 8:
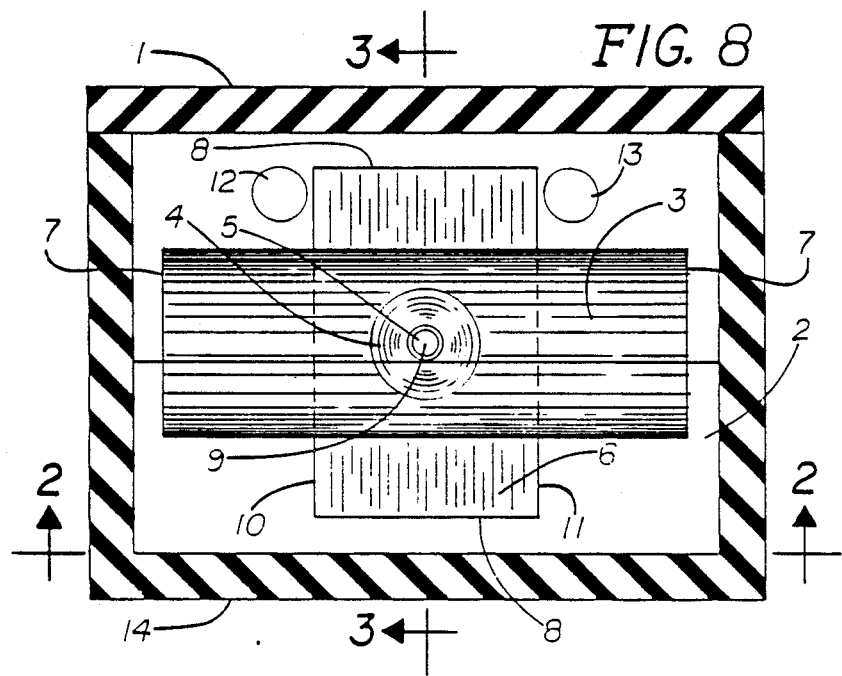
FIG. 8 is a side cross sectional view of a third embodiment.

As previously stated, there are many variants possible for the level sensing unit of my invention. Although flat plate 6 has been described above as rectangular, a plate notched at one or both ends is another variant. Where the plate is notched electrical conducting strips may be placed within the notch or outside each edge of the plate with equivalent results; see FIG. 7.

The operation of my level sensing unit is perhaps best understood with respect to the flat bottom surface, 14, whose orientation can be changed. The reservoir contains liquid to a height generally covering no more than half of the float. When 14 is on a level surface, float 3 is coparallel to the horizon line and plate 6 is normal to it, with both edges of the plate equidistant from the electrical strips 12 and 13, that is, not in contact with either one. As the housing is rotated clockwise, the left hand portion of the bottom surface becomes higher than the right hand portion. However, the float remains coparallel to the horizon line and plate 6 remains normal to it, with the result that at some degree of rotation the right hand edge of the plate, 11, makes physical and electrical contact with the right hand strip, 13. Conversely, upon counterclockwise rotation the right hand portion of the bottom surface becomes higher than the left hand portion and the left hand edge of the plate, 10, makes physical and electrical contact with the left hand electrical strip, 12.

In that variant where the electrical strip is a cylindrical solid notched or slotted in the region of contact with the edge of the plate, the strip is fit into the housing so no leakage of fluid results while enabling the strip to be rotated, as by a slotted head, from the outside of the housing. Such rotation effectively varies the distance between the edge of the flat plate and the electrical strip. This varies the sensitivity of the level sensing unit, that is, the angular deflection from level necessary to make electrical contact between an edge of the plate and its nearest electrical strip.

Many liquids may be used in the unit and are largely a matter of choice subject to some general requirements. The liquid must be unreactive with materials with which it comes into contact, must flow readily at the minimum operating temperatures contemplated, and should not have a high vapor pressure at maximum contemplated operating temperatures. The liquid needs to be nonconductive, and neither reactive with nor absorbed by the housing or any material it is likely to contact. The operation of the unit is relatively insensitive to the specific gravity of the liquid, which is therefore not a critical consideration.

Having described a level sensing unit in quite specific terms as a discrete embodiment, it is important to appreciate that my invention is a quite general one which encompasses an entire class of devices bound by common threads of symmetry properties. A generalized level sensing unit has an enclosed housing containing a reservoir for liquid which exerts a buoyant force on a float assembly which comprises a float member and conducting members. The float assembly has a 2-fold axis of rotation and two mirror planes intersecting in a line which is this 2-fold rotational axis. More succinctly, the float assembly has $C_{2v}$ symmetry. The float assembly is pivotally mounted on an axle coincident with the 2-fold rotational axis, said axle mounted between opposing walls of the housing. The float has at least one conducting member extending above the opposite surfaces of the assembly in a plane normal to the rotational axis. If there is but one conducting member, that member will have two lateral edges, and adjacent to each edge is a conducting strip at least one of whose terminii is imbedded in a wall of the housing. Where there are two conducting members, or two protrusions of a single conducting member, each of two conducting strips will be adjacent to each member, or each protrusion of a single conducting member. When the level sensing unit is at level with respect to the local horizon there will be a plane of symmetry along the $C_{2v}$ axis as to the internal elements of the level sensing unit, which is to say the float member, conducting member(s) on the float, and the conducting strips. Expressed differently, at level the elements of the float, the conducting members on the float, and the conducting strips are arranged with bilateral symmetry with respect to the axle. The only other requirement for the level sensing unit is that the conducting member(s) be in electrical contact with the axle.

The design of a contractor's level incorporating two of the level sensing units described, so as to measure both the horizontal and vertical (plumb) level, is susceptible to a multitude of variants, and an embodiment is shown in FIG. 5. The level 18 has a generally rectangular, beam-like shape and incorporates two level sensing units oriented 90° relative to each other. If the surface 19 be designated as that side which is to be placed on the surface whose level is to be measured, the sides 20 and 21 will be the "top" when the level is used as a level and plumb device, resp. Thus the upper and lower surfaces, 20 and 19, resp., must be substantially parallel, and surface 21 and its opposed counterpart substantially perpendicular, to the lower surface. The level also contains a battery compartment, 22, for releasably containing batteries necessary to power an electrical circuit incorporating the level sensing unit, two sets of indicator lights, 23-26, conveniently grouped toward the middle to indicate deviations from level, an on-off switch, 27, and a tone generator, 28, such as a buzzer. Two level sensing units 29 and 30, which measure level and plumb, respectively, are at the nub of the level and are located internally and, arbitrarily in the drawing, on either side of the indicator lights. If the right hand level be designated as the plumb sensor, then it will be oriented by rotating FIG. 1 90° counterclockwise and the other level sensing unit will be oriented as in FIG. 1.

Figure 6:
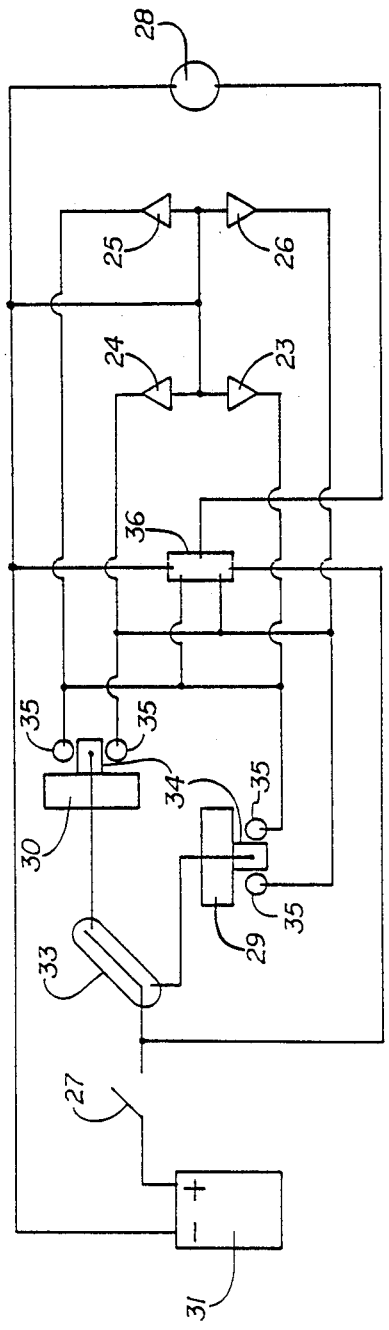
FIG. 6 is a circuit diagram of one simple circuit incorporating the level sensing units of this invention in a level indicating device.

The operation of the level may be better understood by referring to FIG. 6, which shows one of several simple circuits which may be incorporated into the level. A battery, 31, contained in the level's battery compartment supplies power and may be, for example, a simple 9 volt battery of the type commonly produced. Switch 27 is an on/off switch for the circuit. An optional mercury switch, 33, operative for both the level and plumb mode, may be incorporated to eliminate chatter. Both 34 and 35 are those portions of the level and plumb sensing units, resp., incorporated into the electrical circuit and are composed of the flat plate 6 and the conducting strips 12 and 13 on each side of the plate edges. A relay, 36, such as a 5 VDC relay, which is normally closed, a tone generator 28, and indicator lights 23-26 complete the essential elements of this simple circuit.

Where the device is used to measure level mercury switch 33 and level sensing unit 29 determine the state of the electrical circuit. Where the surface measured is not level and the left hand side is the higher one, the flat plate will close the circuit with conducting strip 13. Following the wiring diagram it can be seen that indicator lights 23 and 25 will be on. since the relay is normally closed but will open upon completion of the circuit including the flat plate and either conducting strip, the tone generator will be silent. If the measuring surface is not level but the right hand side of the device is the higher one, the flat plate and conducting strip 12 will close the circuit, indicator lights 24 and 26 will be on and the tone device again will be silent. Finally, if the surface measured is level neither conducting strip 12 nor 13 makes contact with the flat plate, all lights are off, the relay is closed, and a tone will sound. Thus, one using the level may place the device on a surface, change the orientation of the surface without looking at the level, and merely wait for the tone indicator to go on as a signal that a level status has been reached. By glancing at the status of the indicator lights the operator also will immediately know the direction of deviation from level and therefore know the direction in which corrections must be made.

When used to measure plumb the device operates similarly. Briefly, if the unit deviates from plumb in a direction corresponding to a clockwise orientation indicator lights 23 and 25 will be on; if the deviation corresponds to a counterclockwise rotation then lights 24 and 26 are on; and if there is exact plumb all the lights are off but the tone indicator generator will be on.

One skilled in the art will recognize that many combinations of the level sensing unit described herein, as well as many circuit variants, may be combined to give various embodiments of a contractor's level. All such embodiments are intended to be subsumed within the aforementioned description.

What is claimed is:

1. A level sensing unit comprising a sealed housing with a front and back wall, a top and bottom and two side walls and containing a fluid reservoir;

an axle with an electrically conductive surface connected to and extending between the front and back walls;

a generally cylindrical float pivotally mounted on the axle via a bushing with an electrically conductive surface located approximately centrally on the float, coincident with a short axis thereof, and in electrical contact with the axle;

said float having a flat electrical conductive plate with a first and second edge intersecting the float along its long axis and placed normal to and in electrical contact with said bushing, said plate extending above the surface of the cylindrical body and placed approximately midway between the ends of the float and disposed symmetrically with respect to said bushing; and first and second electrically conductive strips mounted between the front and back walls coparallel to the axle and proximate to the first and second edges of said plate.

2. The level sensing unit of claim 1 where each of the electrically conductive strips is a cylindrical body having a notch at a position opposite the edge of the plate.

3. The level sensing unit of claim 1 where the flat conductive plate has a notch in at least one end with the first and second electrically conductive strips placed inside said notch.

4. A level sensing unit comprising an enclosed housing containing a fluid reservoir, a float assembly having $C_{2v}$ symmetry and a pair of electrically conducting strips;

the float assembly comprising a float member and at least one conducting member, said conducting member being normal to the rotational axis of the float and protruding above the opposite surfaces of the float;

the float assembly pivotally mounted along its 2-fold rotational axis on an axle extending between opposing walls of the housing;

the axle in electrical contact with the conducting member;

the pair of electrically conducting strips adjacent to the lateral surfaces of the conducting member;

the float assembly and pair of electrically conducting strips arranged bilaterally symmetrical with respect to the axle.

* * * * *